Sept. 12, 1950 T. F. ESERKALN 2,522,353
INFINITELY VARIABLE SPEED DRIVE MECHANISM
Filed June 7, 1947 2 Sheets-Sheet 1

Fig. 1.

Inventor:
Theodore F. Eserkaln
Peck & Peck
Attorneys

Patented Sept. 12, 1950

2,522,353

UNITED STATES PATENT OFFICE 2,522,353

INFINITELY VARIABLE SPEED DRIVE MECHANISM

Theodore F. Eserkaln, Wauwatosa, Wis., assignor to George Gorton Machine Company, Racine, Wis., a corporation of Wisconsin Application June 7, 1947, Serial No. 753,207

14 Claims. (Cl. 74—230.17)

This invention relates to infinitely variable speed drive mechanism; and the nature and objects of the invention will be readily recognized and understood by those skilled in the art in the light of the following explanation and detailed description of the accompanying drawings illustrating what I now believe to be the preferred embodiments or mechanical expressions of the principles and several features of the invention from among various other embodiments, forms, arrangements, designs, mechanical expressions and combination, of which the invention is capable and adapted within the spirit and scope thereof.

It is a primary object of my present invention to provide an efficient, accurately adjustable and reliable but inexpensive belt drive of the infinitely variable speed type which, while of general utility as a variable speed drive, is particularly intended for adaptation to and use as a low cost drive unit of wide speed range with various types of machine tools for operating the working spindles of such tools.

A further object is to provide such a variable speed drive which is of a compact design and arrangement of mechanically simple and inexpensive construction, yet which will provide for a wider or increased speed range with the drive capable of accurate selective adjustment for infinite variations of speed throughout the over-all speed range of the drive.

Another object is to provide an arrangement of adjustable, stepped driving and driven pulleys making up an infinitely variable speed drive, with which a single belt may be employed for shifting to selected sets of said driving and driven pulley steps to attain "stepless" or infinite variation in the rate of speed at which the driven pulley is rotated, throughout the over-all speed range of which such stepped pulley drive is capable.

A further object is to provide the driving and driven pulleys for such a drive, with steps of the infinitely variable effective diameter belt groove type, and to so design and relatively arrange such variable or adjustable steps that each set of aligned driving and driven pulley steps will, when belt connected, provide for infinite speed variation over a range of speeds constituting a portion only of the maximum speed range of the drive with the speed ranges of the sets of steps together making up the maximum or over-all speed range for the drive.

A further object is to provide for adjusting the sets of aligned steps of the driving and driven pulleys in such a manner that when one set is adjusted to the limit of its adjustment at one end of its range of speed, an adjacent set of aligned steps is automatically adjusted and conditioned for receiving a belt from the first set for carrying out progressively from the speed range of the first set, infinite speed variations throughout the range of speed of such conditioned adjacent set without any break or "step" between the speed ranges for the sets of steps.

Another object is to provide a structurally simple and functionally efficient design and construction of stepped pulley for an infinitely variable speed drive, in which the pulley is composed of steps of the infinitely variable effective diameter belt groove type, with the steps of different diameters and the maximum effective diameter of the belt groove of a smaller diameter step being equal to the minimum effective diameter of the belt groove of a larger diameter step; and further, to provide a construction for the steps such that adjustment of one step will always automatically result in equal adjustment of an adjacent step in the opposite direction.

A further object is to provide an operator controlled adjusting mechanism of an efficient and structurally and mechanically simple design requiring a minimum of parts, for such a variable speed drive, through the medium of which mechanism an operator may from a single control point effect accurate precision adjustment of the sets of aligned steps of the driving and driven pulleys to obtain for the driven pulley a selected speed from the infinitely variable speeds within the range of speed of which the drive is capable.

Another object is to so design such a variable speed drive and its adjusting mechanism that the single belt constituting the driving connection between the driving and driven pulleys may be readily quickly hand shifted from set to set of the aligned steps of the pulleys as such sets are adjusted and conditioned to receive the belt.

And a further object is to provide an extremely simple mounting for the driving and driven pulleys and their respective shafts, and to so design the pulleys and their mountings that they will be interchangeable as units, as well as to form the corresponding elements or components of the pulleys as interchangeable for use in either a driving or a driven pulley.

With the foregoing general objects and results in view, as well as certain other objects and results which will be readily apparent from the following explanation and detailed description, the invention consists in certain novel features in design, construction, and arrangement, and in the mounting and combination of elements and organizations, all as will be more fully and particularly referred to and specified hereinafter.

Referring to the accompanying drawings in which similar reference characters refer to corresponding parts and elements throughout the several figures thereof.

A mechanical expression of a drive embodying the principles and features of my invention is illustrated in the accompanying drawings by way of example and not in all respects of limitation, primarily for purposes of explanation. In this selected example, the drive is shown somewhat schematically as constituting a unit of simplified mechanical form but embodying the principles by which "stepless" or infinite speed variation is attainable by the use of stepped pulleys with a single driving belt. The drive of the example embodiment is shown as unattached to any particular machine or mechanism and the element or elements thereof to be driven thereby. However, it is to be understood and it is so intended, that the drive may be associated and operatively combined with any desired machine or mechanism for which it is adapted, and in forming any such association, the drive way be constructed as a separate unit, mounted on and attached to the associated machine, or the drive may be built in to the associated machine as a part or component organization thereof.

In the illustrated example, referring now to the accompanying drawings, the drive is characterized by the provision of a stepped driving pulley 20 and a stepped driven pulley 30, each consisting of two (2) steps of the infinitely variable effective diameter belt groove type, together with a single driving belt B for shifting into driving connection with any selected set of aligned steps of the driving and driven pulleys. The driving pulley 20 includes a smaller diameter step 20S and a larger diameter step 20L, while the driven pulley 30 includes a smaller diameter step 30S and a larger diameter step 30L. The smaller diameter step 20S of driving pulley 20 has a maximum effective belt groove diameter which is equal to the minimum effective belt groove diameter of the larger diameter step 20L, and similarly the smaller diameter step 30S of the driven pulley 30 has a maximum effective belt groove diameter which is equal to the minimum effective belt groove diameter of the larger diameter step 30L of that pulley.

The driving pulley 20 is driven by a driving shaft 21 and the driven pulley 30 drives a driven shaft 31. The pulleys 20 and 30 with their associated shafts 21 and 31 are mounted in position spaced apart with the axes of the shafts 21 and 31 parallel, and are axially positioned relative to each other so that the smaller diameter step 20S and the larger diameter step 20L of driving pulley 20 are opposite and generally aligned with the larger diameter step 30L and the smaller diameter step 30S, respectively, of the driven pulley 30. Thus, in the drive of this specific example, two (2) sets of aligned driving and driven pulley steps are provided for selectively receiving the single driving belt B of the drive.

In this instance, the drive is shown as including a suitable base or supporting structure 10 which may constitute the base for the drive when the drive is constructed and assembled as a separate unit, or which may be formed by any suitable structure of a machine or mechanism with which the drive is associated and combined, or of which the drive forms a built-in component organization.

Preferably, although not essentially, the driving pulley 20 is mounted for movement toward and from the driven pulley 30 and is subjected to forces continuously acting to yieldingly move the driving pulley 20 in a direction away from driven pulley 30 in order to automatically maintain a desired spacing between the driving and driven pulleys when such pulleys are connected in driving relation by the single V-belt B of the drive. Such a mounting of the driving pulley 20 may be carried out in the form shown in the illustrated example, in which a floating base plate or carriage structure 11 is suitably slidably mounted on the base 10 for reciprocation toward and from the driven pulley 30 in a straight line path in a plane perpendicular to the axis of pulley 30, with expansion spring units, such as the unit 12 shown, utilized to continuously apply forces to the floating base plate 11 in a direction to yieldingly force the plate with pulley 20 away from the driven pulley 30. It will be understood, however, that any desired and suitable force developing means other than the spring form here shown may be utilized. Each expansion spring unit 12 may be mounted in a suitable bore 12a in the inner end of plate 11 confined under compression between the plate and adjacent fixed abutment forming structure 12b on base 10, against which the outer end of a spring unit 12 is engaged and seated.

Any suitable arrangement of adjustable stop means (not shown) may be provided for engagement by base plate 11, to limit movement of such plate in a direction away from the driven pulley 30 under the action of the spring units 12. Where, as in the example hereof, pulleys of the V-belt groove type are employed with a V-belt of the fixed length type, it is unnecessary to substantially load the belt for belt tensioning from the spring units 12. Hence, if desired, the stop means may be adjusted for positive engagement by the base plate 11 to position the driving pulley 20 spaced from the driven pulley 30 a distance such that the belt grooves of pulleys 20 and 30 will receive the belt B in normal frictional driving connection therein without additional tension loading of the belt. The spring loaded base plate 11 is primarily for the purpose of maintaining the base plate in position against the stop means, while permitting movement of the plate with the pulley 20 toward pulley 30 to enable shifting of the belt B from one set of pulley steps to another, as well as for belt removal from or replacement in driving connection on the pulleys 20 and 30 constituting the drive. However, if desired, the spring loaded base plate 11 may be utilized for continuous automatic tension loading of the belt B, by so adjusting the stop means for the base plate that the limit of movement of the plate with pulley 20 in a direction away from pulley 30 will be greater than the distance of such movement which is permitted by the fixed length belt B when the latter is mounted in driving connection on and between the pulleys.

The driving pulley 20 and its shaft 21 are rotatably mounted and supported on the floating base plate 11 by means of an annular anti-friction bearing assembly 21a which is mounted in a circular recess 21b formed by an enlarged diameter portion of a bore 21c extending transversely through the floating base plate 11. The driving shaft 21, in this instance, extends through an opening 21d formed through the base structure 10, opposite and in general alignment with bore 21c of plate 11, such opening 21d having a width or diameter to permit of movement of shaft 21 therein throughout the maximum range of movement of the shaft with the floating base plate 11.

The variable effective diameter driving pulley 20 and driven pulley 30 are of identical design and construction and are interchangeable as assembled pulley units, while corresponding parts and elements making up the pulleys are also interchangeable in assembly and for replacement. Such feature is of considerable advantage in maintaining low cost of construction and assembly of the pulleys and of a drive formed therefrom.

The pulley 21 includes the smaller diameter step 20S and the larger diameter step 20L, with step 20S composed of an inner, axially fixed disc 22 having a hub portion 22a which is mounted and received in the inner race of the bearing assembly 21a mounted in the floating base plate 11. This disc 22 has an axial bore therethrough which receives the shaft 21 and which is fixed to such shaft for rotation therewith by suitable splines 22b formed on this shaft. Disc 22 is held against movement axially of and relative to the shaft at the inner side of the disc by the bearing assembly 21a and at the outer side thereof by an annular shoulder formed by the inner end of an enlarged diameter, intermediate portion 21e of shaft 21. The step 20S is completed by a movable disc 23 which is mounted on the enlarged diameter intermediate portion 21e of the shaft 21 adjacent the fixed disc 22 for movement axially of shaft 21 toward and from such fixed disc. The discs 22 and 23 are, in this example, equal in overall diameter and are formed with oppositely outwardly beveled opposite inner faces to form the V-belt groove VS therearound and therebetween. The effective diameter of the V-belt groove VS of step 20S is decreased by moving disc 23 outwardly away from disc 22, and increased by moving disc 23 inwardly toward disc 22.

The movable disc 23 of step 20S has a sleeve forming hub 24 extending outwardly therefrom on the intermediate portion 21e of shaft 21, this hub being formed with an axial bore therethrough having suitable splineways therein which slidably receive a series of splines 24a formed on the intermediate shaft portion 21e, so that disc 23 with its hub 24 is rotated by rotation of shaft 21 while being movable in either direction and axially of the shaft.

The larger diameter step 20L of driving pulley 20 is composed of a movable disc 25 and a fixed disc 26, these discs being of equal over-all diameters. The movable disc 25 is mounted on the extended hub portion 24 of the movable disc 23 of pulley step 20S. Disc 25 is fixed on such hub portion for rotation therewith and with the disc 23 as a unit, as well as for movement as a unit therewith on and axially of the intermediate portion 21e of shaft 21, toward and from the fixed disc 26 of the larger diameter step 20L of driving pulley 20.

The fixed disc 26 of larger diameter step 20L is mounted on the outer end of shaft 21 and is seated on and has bearing engagement against an annular shoulder formed around shaft 21 by the outer end of the increased diameter intermediate portion 21e of the shaft. Disc 26 is formed with an axial shaft receiving bore therethrough which is provided with suitable splineways for receiving and engaging splines 26a formed on the outer end portion of the shaft for rotation of the disc 26 by and with shaft 21. The discs 25 and 26 are formed with oppositely outwardly beveled opposed inner faces to form the V-belt groove VL therearound and therebetween, the effective diameter of which is decreased by moving disc 25 inwardly away from disc 26 and is increased by moving disc 25 outwardly toward disc 26.

A column structure 27 is mounted in fixed position on the inner end of the floating base plate 11 that is adjacent the driven pulley 30, with the structure extending outwardly from plate 11 in generally parallel relation with the driving shaft 21. Column structure 27 is provided with an arm 27a which extends therefrom to and over the outer end of driving shaft 21. The end of arm 27a is formed with a circular recess 27b therein concentric with the outer end of driving shaft 21, and an annular anti-friction bearing assembly 27c is mounted in such recess. The fixed disc 26 of pulley step 20L is formed with an outwardly extending hub portion 26b which extends into and is rotatably journaled in the anti-friction bearing assembly 27c. Fixed disc 26 is thus mounted and maintained in position on shaft 21 against axial movement relative thereto, between the shoulder at the outer end of the intermediate shaft portion 21e and the anti-friction bearing assembly 27c.

The movable disc 23 of pulley step 20S and the movable disc 25 of pulley step 20L thus form a unit which is movable axially of shaft 21 between the fixed discs 22 and 26. Hence, when this movable disc unit which is common to the two steps 20S and 20L, is moved toward the fixed disc 26, it results that the movable disc 25 is moved toward disc 26 to thereby increase the effective diameter of the belt groove VL while at the same time the disc 23 is moved away from the fixed disc 22 of pulley step VS through an equal distance to simultaneously decrease the effective diameter of the belt groove VS of the smaller diameter step 20S of the pulley 20. Movement of this common movable disc unit in the opposite direction, that is, toward the fixed disc 22 of the smaller diameter pulley step 20S, will result in simultaneous movement of disc 25 away from disc 26 to decrease the effective diameter of belt groove VL and simultaneous equal movement of disc 23 toward disc 22 to increase the effective diameter of the belt groove VS of pulley step 20S.

In accordance with a feature which provides one of the distinguishing characteristics of my invention in providing an infinitely variable speed drive of wide speed range utilizing but a single driving belt, the maximum effective diameter belt groove VS of the smaller diameter pulley step 20S of the driving pulley 20, is equal to the minimum effective diameter of the belt groove VL of the larger diameter pulley step 20L. Hence, it will be apparent that when the movable disc unit composed of the discs 23 and 25 is moved to its limit of movement inwardly toward the fixed disc 22 of step 20S to the position of maximum effective diameter for that step, the disc 25 of step 20L is simultaneously moved to its limit of movement away from disc 26 to the position of minimum effective diameter for step 20L, so that the effective diameters of the belt grooves VS and VL of steps 20S and 20L are then of equal diameters.

An actuating member in the form of an arm 28 is provided for moving the unit composed of discs 23 and 25 of pulley 20 axially of shaft 21 for adjusting these discs relative to the fixed discs 22 and 26, respectively. Arm 28 is mounted at its base end 28a in the vertical column structure 27 for bodily movements of the arm therein relative thereto in either direction along a straight line path parallel to the axis of shaft 21. The movable mounting for arm 28 may, as in the example hereof, embody slots or grooves 28b (only one of which is shown) parallel to the axis of driving shaft 21 in column structure 27 for slidably receiving suitable projections (not shown) provided at opposite sides of the base end 28a of arm 28. Actuating arm 28 extends from its mounting in structure 27 and terminates in a ring member 28c located between discs 23 and 25, surrounding and concentric with intermediate shaft portion 21e of the driving shaft 21 and the hub 24 of disc 23. Ring member 28c mounts and carries an annular anti-friction bearing assembly 29 therein in which hub 24 of disc 23 is rotatably received and journaled, with the bearing secured to the hub in position between discs 23 and 25 against axial movements relative thereto so as to form a rotative coupling between the arm and the movable disc unit composed of the discs 23 and 25 with the common hub 24.

The driven pulley 30 is in this example, identical in construction and general mounting, as well as in dimensions, with the driving pulley 20 described in detail hereinabove. The smaller diameter pulley step 30S includes the fixed disc 32 and the movable disc 33 providing the V-belt groove VS therebetween and therearound corresponding to and of the same dimensions as the V-belt groove VS of the smaller diameter step 20S of pulley 20. The larger diameter step 30L includes the axially fixed disc 36 and the movable disc 35, which latter disc is mounted for movement as a unit with the movable disc 33 of step 30S, being mounted on the extended hub 34 of the movable disc 33 in a manner similar to this construction as described in connection with the corresponding discs of driving pulley 20. The pulley step 30L formed by the discs 35 and 36 provides a variable effective diameter V-belt groove VL therebetween and therearound and is so dimensioned that the minimum effective diameter thereof is equal to the maximum effective diameter of the V-belt groove VS of the pulley step 30S composed of the discs 32 and 33. Pulley step 30L of pulley 30 is in this example identical in dimensions and in range of adjustment with pulley step 20L of the driving pulley 20.

However, the driven pulley 30 is mounted and rotatably journaled on the base 10 in a reversed position relative to the mounted position of the driving pulley 20 on the floating base plate 11, so that, the larger diameter step 30L thereof is opposite and aligned with the smaller diameter step 20S of pulley 20, while the smaller diameter step 30S is opposite and aligned with the larger diameter step 20L of driving pulley 20. The inner end of pulley 30 is rotatably journaled in an annular anti-friction bearing assembly 31a mounted in base 10, which assembly receives and rotatably journals the hub 36b of disc 36. The outer end of pulley 30 is mounted and rotatably journaled in an annular anti-friction bearing assembly 37b which is mounted in the inner side of an arm 37a of a column structure 37 mounted in fixed position on base 10 at the inner side of pulley 30 between that pulley and the adjacent column structure 27 for pulley 20, column structure 37 being generally similar to structure 27. The bearing assembly 37b receives and rotatably journals the outwardly extending hub 32a of the fixed disc 32 of pulley step 30S, in a manner similar to that described in connection with the mounting of driving pulley 20.

The movable disc unit of pulley 30 composed of the discs 33 and 35, is mounted on the splined intermediate portion 31e of the driven shaft 31 and is actuated through the medium of an actuating arm 38 carrying the anti-friction bearing assembly 39 in a ring member 38c carried by the end of the arm, which ring member and bearing assembly receive and rotatably journal the extended hub 34 of the movable disc 33 of pulley step 30S, in a manner similar to that described in connection with the rotative coupling of the actuating arm 28 with the movable disc unit of pulley 20.

An adjusting mechanism is provided for accurate precision adjustments of the belt grooves of the steps of the driving and driven pulleys 20 and 30 to selectively set these pulleys for rotating the driven pulley 30 and its shaft 31 at a selected speed of rotation within the range of speed of which the drive is capable. In this instance, a mechanically simple form of such adjusting mechanism is disclosed as embodying a shaft 40 mounted and journaled in and extending axially through the column structure 37 in position with its axis parallel to the axes of the parallel driving and driven shafts 21 and 31. The shaft 40 has externally screw threaded sections 41 and 42 thereon of opposite hand threading. The base end 38a of actuating arm 38 of pulley 30 is formed with an internally threaded bore therethrough, into and through which the threaded section 41 of shaft 40 is threaded, this base end 38a of arm 38 being suitably slidably engaged with column structure 37 so as to maintain arm 38 against rotation about the axis of shaft 40 while permitting the base and the arm to be moved on the shaft axially thereof when shaft 40 is rotated.

A block or nut member 43 having an internally threaded bore therethrough is mounted and threaded on the externally threaded section 42 of shaft 40, such section 42 being of opposite hand threading to the threaded section 41. The block 43 is mounted in slidable engagement with the column structure 37 to maintain the block against rotation on shaft 40 while permitting it to move or translate axially on the shaft. Block 43 includes a pin 44 rigid therewith and extending from the side thereof adjacent the base end of actuating arm 28 for pulley 20. Pin 44 extends and is slidably received in a bore 28c formed through the base end 28b of arm 28, the axis of pin 44 and of bore 28c being parallel with the plane of movement of the reciprocal base plate 11 on which the driving pulley 20 is mounted. Pin 44 forms the operative connection between the block 43 on shaft 40 and the actuating arm 28 for moving that arm while providing a sliding connection permitting movements of the arm with the floating base plate 11 relative to the block 43 and the pin 44.

Operation of the adjusting mechanism is effected in the instant embodiment example of the invention, through the medium of a hand crank 45 which is fixed on the outer end of shaft 40 for rotating that shaft in either direction to actuate the movable discs of the driving pulley 20 and driven pulley 30 to selected positions of adjustment to establish the required effective diameters of the belt grooves of the pulley steps to attain the desired speed of rotation of the driven pulley 30. While a manually operated operating crank 45 is disclosed for the adjusting mechanism, it is to be understood that any other suitable operating element or means may be employed of either the manual or power control type.

Figure 1:
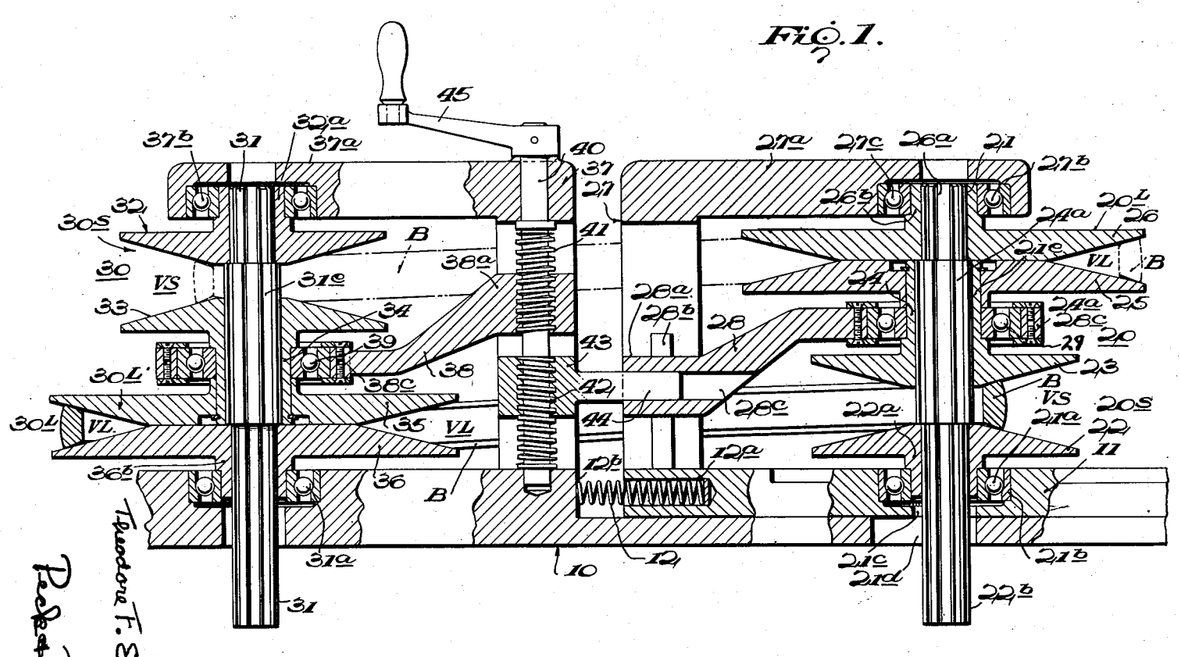
Fig. 1 is a vertical longitudinal sectional view through a drive unit of the invention, with the unit adjusted for either the minimum low speed or the maximum high speed operation of the over-all speed range of the drive, the belt being shown in full lines mounted on the set of aligned pulley steps for minimum low speed operation, and being indicated in dotted lines mounted in position on the adjacent aligned pulley steps for maximum high speed operation, of the driven pulley.
Figure 2:
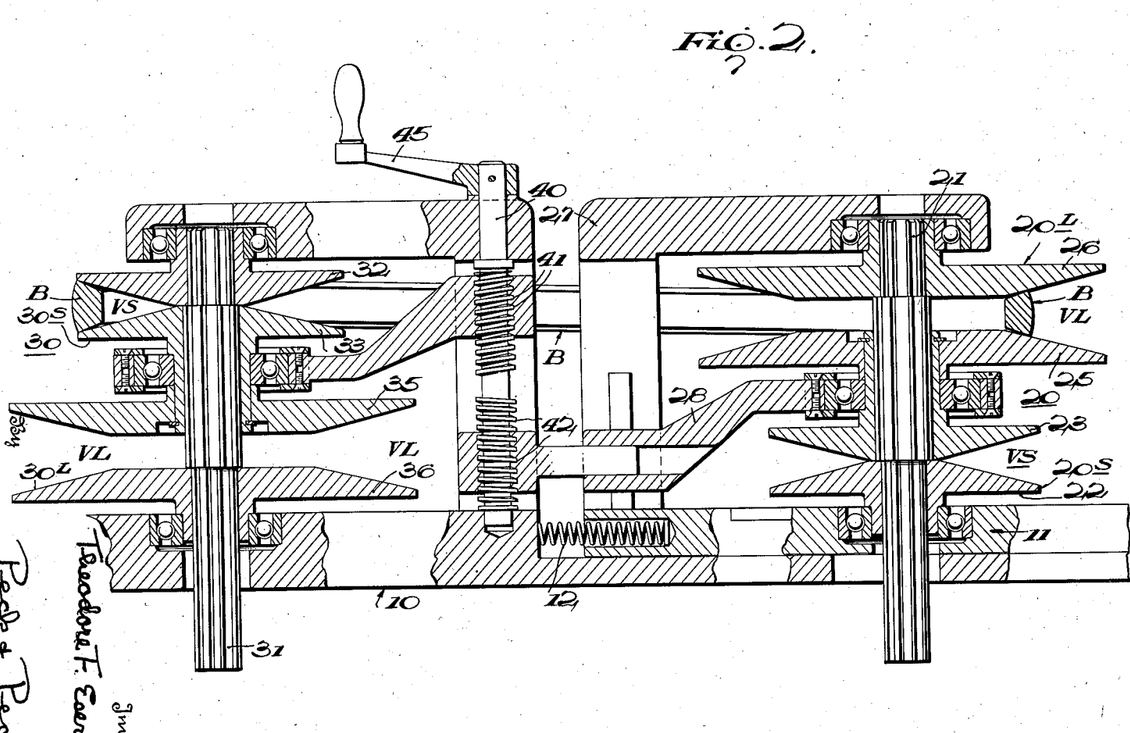
Fig. 2 is a view similar to Fig. 1 but with the drive adjusted with the driving and driven pulleys thereof in 1:1 driving ratio, the belt of the drive being shown on that set of aligned pulley steps which is adjustable for infinite speed variations over the higher range of speeds of the over-all speed range.

The movable disc units of the pulleys 20 and 30, together with their actuating arms 28 and 38 and the adjusting mechanism for operating such arms, are so assembled in drive forming relation, that with the movable disc unit of pulley 20 adjusted to its limit of outward movement on the intermediate portion 21e of shaft 21, the movable disc unit of pulley 30 is moved in the opposite direction to its limit of inward movement on the intermediate portion 31e of shaft 31, as shown in Fig. 1 of the drawings. When the movable disc unit of pulley 20 is moved by the adjusting mechanism in the reverse direction to its limit of inward movement, the movable disc unit of pulley 30 is moved outwardly to its limit of outward movement to the position as shown by Fig. 2 of the drawings. With the drive adjusted to the limit positions as shown in Fig. 1 of the drawings, pulley step 20S of the driving pulley 20 has the belt groove VS thereof at minimum effective diameter, while the larger diameter step 30L of the driven pulley 30, which is aligned with step 20S of pulley 20, is in adjusted position with the belt groove VL thereof at maximum effective diameter, and in such adjusted condition of the drive, the larger diameter step 20L of pulley 20 has its belt groove VL at maximum effective diameter, while the smaller diameter step 30S of pulley 30 which is aligned with step 20L, has the effective diameter of its belt groove VS at minimum effective diameter.

With the drive in the above position of adjustment as shown in Fig. 1, the set of aligned steps 20S and 30L of the pulleys 20 and 30 is in condition for the minimum low speed drive of pulley 30 and its shaft 31 of which the drive is capable, in that the drive through this set of steps from driving shaft 21 to driven shaft 31 is from the smaller effective diameter step 20S to the larger effective diameter step 30L. The set of aligned steps 20L and 30S of the pulleys in such position of adjustment of the drive, is conditioned for maximum high speed of which this particular drive of the example is capable, in that the drive from driving shaft 21 to driven shaft 31 is from a larger effective diameter provided by the step 20L to a smaller effective diameter provided by the step 30S on the driven shaft 31. As the drive utilizes a single belt, if the minimum low speed of operation of driven pulley 30 and its shaft 31 is desired, then the belt is placed in driving connection on and between the aligned set of steps 20S and 30L, as shown in the full line position of the belt B in Fig. 1. On the other hand, if it is desired to drive pulley 30 and driven shaft 31 at the maximum rate of speed of which the drive is capable, the operator hand shifts belt B from its position on steps 20S and 30L, to position on and in driving connection between the aligned steps 20L and 30S, as indicated by the dotted outline position of belt B on such steps in Fig. 1.

In the example hereof, each of the sets of the aligned steps of the pulleys 20 and 30 consists of a smaller diameter step and a larger diameter step with the former having a minimum effective belt groove diameter equal to the maximum effective belt groove diameter of the latter. Hence, when the sets of steps are brought to adjusted positions in which the respective effective belt groove diameters thereof are equal, the driving ratio between the steps of each set of steps will be 1:1; and, the driven pulley 30 and its driven shaft 31 will be rotated at the same rate of speed at which the driving shaft 21 and its pulley 20 are rotated or driven. Thus, the single belt B when mounted on either set of aligned steps will drive in 1:1 ratio and, if shifted from either set to the other, will not change such ratio or vary the rate of speed at which the driven pulley 30 and its shaft 31 will be driven from the driving shaft 21 through pulley 20. Such position of adjustment of the drive for 1:1 driving ratio between the driving and driven pulleys 20 and 30, is disclosed in Fig. 2 of the drawings, the belt B being shown in position on the aligned set of steps 20L and 30S.

The sets of aligned pulley steps making up the driving pulley 20 and driven pulley 30 of the drive, are each infinitely adjustable through their respective ranges of adjustment between the opposite end limits of adjustment disclosed in Figs. 1 and 3, respectively, by means of the adjusting mechanism which includes shaft 40 with the opposite hand threaded sections 41 and 42 rotatable by hand crank 45.

In the operation of the drive, rotation of shaft 40 in either direction always results in translation of arms 28 and 38 and the movable disc units, respectively, rotatatively coupled therewith, in opposite directions axially of the driving and driven shafts 21 and 31, respectively. Assuming that hand crank 45 has been rotated to position the movable disc unit of pulley 20 at its limit of outward movement with resulting movement of the movable disc unit of driven pulley 30 in the opposite direction to its limit of inward movement, as shown in Fig. 1 of the drawings, then the operator mounts belt B on either the set of aligned steps 20S and 30L for minimum low speed operation, or on the set of aligned steps 20L and 30S for maximum high speed operation, as hereinbefore described.

If the belt B is, as shown in Fig. 1, mounted on and in driving connection between pulley steps 20S and 30L, the operator may then adjust the pulleys to infinitely vary the speed at which the driven pulley 30 and its shaft 31 will be driven, within the speed range between the limit position shown in Fig. 1 and the limit position in the opposite direction as shown in Fig. 2. Such infinite adjustment and speed variation is effected by rotation of the hand crank 45 to vary the ratio of the effective belt groove diameters of steps 20S and 30L for the required rate of speed of operation of driven pulley 30 and its shaft 31. In carrying out such adjustment, as the movable disc unit of pulley 20 is moved inwardly toward fixed disc 22 of that pulley to increase the effective diameter of belt groove VS, the movable disc unit of pulley 30 is moved in the opposite direction outwardly away from the fixed disc 36 of pulley 30 an equal distance to correspondingly decrease the effective diameter of belt groove VL of pulley step 30L. Such adjustments of pulley steps 20S and 30L progressively decreases the ratio between the effective diameters of the belt grooves thereof to thus progressively increase the rate of speed at which pulley 30 will be driven from the driving pulley 20. In the reverse of the foregoing operation to adjust steps 20S and 30L for decreased speed of operation of driven pulley 30, the movable disc unit of pulley 20 is moved away from fixed disc 22 with simultaneous movement in the opposite direction of the movable disc unit of pulley 30 to move disc 35 toward the fixed disc 36, so that, the ratio between the effective diameters of the belt grooves VS and VL may be progressively increased to thus progressively decrease the rate of speed at which pulley 30 will be driven from the driving pulley 20.

Thus, in this example of a drive of my invention, the set of aligned pulley steps 20S and 30L provides for infinite variations of speed over a portion only of the over-all speed range of which the drive is capable, that is, over the portion of the over-all speed range covering the lower rates of speed in a range from the minimum low speed (adjusted position of Fig. 1) to the maximum low speed (adjusted position of Fig. 2) which in the drive of this example, is a rate of speed equal to the rate of speed at which the driving shaft 21 is driven.

The set of aligned pulley steps 20L and 30S provides for infinite variations of speed at which pulley 30 will be driven over the remaining portion of the over-all speed range, which remaining portion covers the higher rates of speed in a range from the minimum high speed (adjusted position of Fig. 2) to the maximum high speed (adjusted position of Fig. 1).

Adjustment of the set of pulley steps 20L and 30S is effected by rotation of shaft 40 in the desired directions. To decrease the ratio between the effective diameters of pulley steps 20L and 30S, from their position of adjustment shown in Fig. 1, crank 45 is rotated in a direction to cause movement of the movable disc unit of pulley 20 inwardly in a direction away from fixed disc 26 to decrease the effective diameter of belt groove VL, and simultaneously to move the movable disc unit of pulley 30 in the opposite direction, that is, outwardly toward fixed disc 32 to increase the effective diameter of belt groove VS of step 30S. In order to increase the ratio of the effective diameters of pulley steps 20L and 30L to increase the rate of speed at which pulley 30 will be driven, the movable disc units are simultaneously moved in the reverse directions to that above described. Of course, adjustments of either the set of steps 20S and 30L or the set of steps 20L and 30S automatically causes simultaneous corresponding and correlated adjustment of the other set, so that, there is an automatic adjusting of each set by adjustment of the other set to relatively condition the sets of steps for progressive infinite speed variation through the over-all speed range of the drive by selective shifting of belt B from one to the other of the sets of pulley steps. Thus, the over-all speed range of the drive is composed of the speed range covered by the set of aligned steps 20S and 30L through the lower rates of speed, and the speed range covered by the set of aligned steps 20L and 30S through the higher rates of speed. And of especial note is the fact that the maximum low rate of speed at the end of the range covered by the set of steps 20S and 30L is equal to the minimum high rate of speed of the range covered by the set of steps 20L and 30S, so that, "stepless" or infinite variations of speed may be effected through the over-all range of speed of the drive, notwithstanding the use of stepped pulleys for the drive. With the drive arranged for simultaneous equal adjustment in opposite directions of the variable effective diameter steps of each pulley and also of the steps of each pulley relative to the steps of the other pulley, it follows that when the set of steps 20S and 30L for the range of lower rates of speeds is adjusted to give the maximum low rate of speed for that range, then the set of steps 20L and 30S for the range of higher rates of speed is automatically simultaneously adjusted to position to give the minimum high rate of speed for that range. As the maximum rate of speed for which the low speed range steps 20S and 30L may be adjusted, is equal to the minimum rate of speed for which the high speed range steps 20L and 30S may be adjusted, namely, in this instance, the rate of speed of the driving shaft 21, then the set of steps 20L and 30S are conditioned to receive the belt B and carry on infinite speed variations in upward progression from the range of speeds for the set of steps 20S and 30L, while the latter set of steps are conditioned to receive the belt and carry on infinite speed variations in downward progression from the range of speeds for the steps 20L and 30S.

In the specific drive of the present example, the steps of each set of aligned steps of the pulleys 20 and 30, have a maximum ratio between the effective diameters of their belt grooves of approximately the order of $3\frac{1}{3}:1$, although the invention is not limited or restricted to this particular ratio. If it be assumed that the input speed of the driving shaft 21 is 1000 R. P. M., then pulley 20 is also rated at such speed and with the drive in the adjusted position of Fig. 1 with the set of steps 20S and 30L set for minimum low output speed and the set of steps 20L and 30S set for maximum high output speed, if the belt B as shown in Fig. 1 is mounted on steps 20S and 30L, pulley 30 and its shaft 31 will be driven at a speed of approximately the order of 300 R. P. M. If belt B is shifted to the set of pulleys 20L and 30S, then pulley 30 and shaft 31 will be driven at the maximum high speed of which the drive is capable, namely, approximately 3000 R. P. M. The range of speeds for the set of pulleys 20S and 30L will then be from 300 R. P. M. to 1000 R. P. M., while the range of speeds for the set of steps 20L and 30S will be from 1000 R. P. M. to 3000 R. P. M., with the over-all speed range for the drive thus being 300 R. P. M. to 3000 R. P. M. or of the order of 10:1. And with the belt B on either set of steps, the speed within the range for such set is infinitely variable upwardly and downwardly through the range, by selective operation of the adjusting mechanism. With the drive in adjusted position of Fig. 2, the driven pulley 30 and its shaft 31 will be in 1:1 driving relation with pulley 20 and shaft 21, so that, in the assumed example, pulley 30 and its shaft 31 will be driven at a speed of 1000 R. P. M., and belt transition from one set of steps to the other may be made without a break or "step" for progresive infinite speed variation between the speed ranges of the respective sets of pulleys.

By the use of a pulley step adjusting mechanism of the irreversible type, such as in the form of the present example which includes the opposite hand threaded sections 41 and 42 on the adjusting shaft 40, accurate precision adjustments may be made. Any suitable calibrated dial or scale markings (now shown) may be provided for cooperative visual use with the positions of the hand crank 45, as will be readily understood by those skilled in the art. Obviously, my invention is not limited to the specific type or construction of adjusting mechanism illustrated in the example embodiment hereof, as various other designs and mechanical arrangements of adjusting mechanism may be utilized.

The design and arrangement of the pulley supporting and mounting structures 27 and 37 together with the location and cooperative mounting of the adjusting mechanism, is such that the outer, belt engaged sides of the driving and driven pulleys 20 and 30, are completely unobstructed for ready belt removal and replacement, as well as for ease of manual shifting of the single belt B between the two (2) sets of aligned pulley steps. And while hand shifting of the belt B is employed with the drive of this example, a drive embodying my invention is not limited or restricted in all respects to manual belt shifting.

While in the example hereof, the pulleys 20 and 30 are disclosed as each consisting of but two (2) steps, the invention contemplates and includes the multiplication of steps for increasing the over-all speed range of the drive, if desired or found expedient. It will be clear that in adding steps to carry out progressive increases of the over-all speed range either upwardly or downwardly, the effective belt groove diameters of the added steps and the ratios therebetween may bear the same relationship to adjacent steps as that provided for the sets of steps in the illustrated example. And while in the preferred embodiment of a drive of the invention as disclosed and explained herein, the effective diameters of the steps bear such relation to each other and the steps are so relatively arranged and mounted, that infinite speed variation without a break or "step" between pulley steps is attained, my invention is not necessarily so limited as, under certain conditions and with certain embodiments thereof, it is contemplated and intended that an arrangement may be employed in which there is a definite break between the speed ranges covered by the respective sets of aligned pulley steps.

It will also be evident that various other changes, modifications, substitutions and eliminations might be resorted to without departing from the spirit and scope of my invention and, hence, I do not desire to limit the invention in all respects to the exact and specific disclosures of the example of the invention herein described, except as may be required by specific intended limitations thereto included in any of the appended claims.

What I claim is:

1. In an infinitely variable speed drive, in combination, a driving pulley and a driven pulley, each of said pulleys including a smaller diameter step providing a belt groove therearound and a larger diameter step providing a belt groove therearound, said steps of each of said pulleys being constructed for adjustment to simultaneously vary in opposite directions the effective diameters of the belt grooves of said smaller and said larger steps, respectively, said driving and driven pulleys being mounted with the smaller diameter step of each pulley opposite the larger diameter step of the other pulley, a single belt for selective mounting on and for shifting between the sets of said opposite smaller and larger diameter steps, respectively, of said driving and driven pulleys, and mechanism for adjusting said driving and driven pulleys simultaneously and equally in opposite directions for infinite variation of the effective diameters of the belt grooves of the steps, respectively of said pulleys throughout the range of adjustment thereof.

2. In an infinitely variable speed drive, in combination, a driving pulley and a driven pulley, each of said pulleys including a smaller diameter step and a larger diameter step with each step providing a belt groove therearound, the steps of each of said pulleys being constructed and arranged for adjustment simultaneously to infinitely vary the effective diameters of the belt grooves of the steps in opposite directions, respectively, said driving and driven pulleys being mounted for relative movements toward and from each other and being axially positioned relative to each other with a smaller diameter step of each pulley opposite a larger diameter step of the other pulley to provide sets of opposite larger and smaller diameter steps, means exerting forces acting to normally yieldingly relatively move said pulleys away from each other, a single endless belt for selective alternate mounting on and for shifting between the sets of said opposite smaller and larger diameter steps, respectively, said pulleys being mounted for relative movements toward each other against said force exerting means to enable shifting said belt from one set of steps to the other set, and mechanism for adjusting simultaneously the sets of opposite steps of said driving and driven pulleys equally and in opposite directions to infinitely vary the driving ratio between the effective diameters of the belt grooves thereof over the respective ranges of adjustment of said sets of opposite steps, respectively.

3. In an infinitely variable speed drive, in combination, a stepped driving pulley including at least two (2) steps each providing a V-belt groove there around and each being constructed and mounted for adjustment simultaneously to infinitely vary in opposite directions the effective diameters of the V-belt grooves of said steps, respectively, a stepped driven pulley including at least two (2) steps each providing a V-belt therearound and each being constructed and mounted for adjustment simultaneously to infinitely vary in opposite directions the effective diameters of the V-belt grooves of said steps, respectively, said driving and driven pulleys being mounted spaced apart with the axes thereof substantially parallel and being relatively positioned axially with the steps of each pulley opposite the steps, respectively, of the other pulley to provide sets of opposite steps, an endless V-belt for selective mounting alternately in driving connection on and between the opposite steps of one or of the other of said sets of steps, respectively, the opposite steps of one of said said sets being constructed to have relative effective belt groove diameters providing driving ratios therebetween for infinite variations in speed of the driven pulley through a pre-determined range of speeds, the opposite steps of the other of said sets being constructed to have relative effective belt groove diameters providing driving ratios therebetween for infinite variations in speed of the driven pulley through a pre-determined range of speeds different from the range of said first mentioned set of opposite steps, and means for adjusting simultaneously the steps of said driving pulley and the steps of said driven pulley in opposite directions, respectively.

4. In an infinitely variable speed drive, in combination a driving pulley and a driven pulley of the variable effective belt groove diameter type each including at least two (2) steps each providing a V-belt groove therearound, said driving pulley and said driven pulley being each constructed for adjustment to infinitely vary simultaneously in opposite directions the effective diameters of the V-belt grooves of the steps thereof, respectively, said driving and driven pulleys being mounted spaced apart with the axes thereof substantially parallel and being relatively positioned axially with the steps of each pulley opposite the steps, respectively, of the other pulley to provide sets of opposite steps, a single, endless V-belt for selective mounting alternately in driving connection on and between the opposite steps of either one or of the other of said sets of steps, respectively, means for adjusting simultaneously the steps of said driving pulley and the steps of said driven pulley in opposite directions, respectively, for infinite variation of the effective diameters of the belt grooves thereof throughout the range of adjustment of the steps of said pulleys, and the relative diameters of the steps of each of said sets of opposite steps being such that at the limit of adjustment thereof by said adjusting means in one direction either of said sets of steps when connected in driving relation by said single belt is adapted to drive the driven pulley at the same rate of speed while at the limit of adjustment by said means in the opposite direction, one of said sets of steps is adapted to drive the driven pulley at the minimum rate of speed and the other set is adapted to drive the driven pulley at the maximum rate of speed of the overall range of speeds of the said drive.

5. In an infinitely variable speed drive of the single V-belt, multiple step pulley type, in combination, a driving pulley including at least two (2) steps each providing a V-belt groove therearound, a driven pulley including at least two (2) steps each providing a V-belt groove therearound, each of said two (2) steps of each of said pulleys being constructed for adjustment simultaneously to infinitely vary in opposite directions the effective diameters of the V-belt grooves of said steps, respectively, said driving and driven pulleys being mounted spaced apart with the axes thereof substantially parallel and being relatively positioned axially with the steps of each pulley opposite the steps, respectively, of the other pulley to provide sets of opposite steps, a single endless V-belt for selective alternate mounting in driving connection on either of said sets of steps and for shifting from one to the other of said sets, the opposite steps of one of said sets being constructed to have relative effective belt groove diameters throughout the range of adjustment thereof to provide when belt connected for infinite variations in speed of the driven pulley through a range of speeds constituting a portion only of the overall range of speeds of the drive, the opposite set of steps of the other set being constructed to have relative effective belt groove diameters throughout the range of adjustment thereof to provide when belt connected for infinite variations in speed of the driven pulley through a range of speeds constituting another portion of the overall range of speeds of the drive, and means for adjusting the steps of said pulley.

6. In an infinitely variable speed drive, in combination, an adjustable driving pulley and an adjustable driven pulley of the variable effective belt groove diameter type each including at least one smaller diameter step providing a belt groove therearound and one larger diameter step providing a belt groove therearound, said driving pulley and said driven pulley each being constructed for adjustment to oppositely vary simultaneously in either direction the effective diameters of the belt grooves of the steps thereof, respectively, said driving and driven pulleys being mounted with the smaller diameter step of each pulley opposite the larger diameter step of the other pulley to provide sets of opposite smaller and larger diameter steps, each of the smaller diameter steps and each of the larger diameter steps of said driving and driven pulleys being constructed so that the maximum effective diameter of the belt groove of each smaller diameter step is equal to the minimum effective diameter of the belt groove of each larger diameter step, and a single, endless belt for selective mounting in driving connection on and between either of said sets of opposite larger and smaller diameter steps and for shifting from one set to the other.

7. In an infinitely variable speed drive, in combination, an adjustable driving pulley and an adjustable driven pulley of the variable effective belt groove diameter type each including at least one smaller diameter step providing a belt groove therearound and one larger diameter step providing a belt groove therearound, said driving pulley and said driven pulley being each constructed for adjustment to oppositely vary simultaneously the effective diameters of the belt grooves of the steps thereof, respectively, said driving and driven pulleys being mounted with the smaller step of each pulley opposite the larger step of the other pulley to provide sets of opposite larger and smaller diameter steps, respectively, the maximum effective diameter of the belt groove of each of the smaller steps constructed to have a maximum effective diameter of the belt groove thereof equal to the minimum effective diameter of the belt grooves of each of said larger steps, repectively, a single endless belt adapted for selective alternate mounting in driving connection between either of said sets of smaller and larger diameter steps and for shifting from one to the other of said sets, and mechanism for simultaneously adjusting the steps of said driving and driven pulleys in opposite directions, respectively, for infinite variation of the effective diameters of the belt grooves thereof throughout the range of adjustment of said sets of opposite steps, respectively, of said pulleys.

8. In an infinitely variable speed drive, in combination, a driving pulley and a driven pulley, each of said pulleys including a smaller diameter step providing a belt groove therearound and a larger diameter step providing a belt groove therearound, each of said pulleys being constructed and arranged for adjustment of the steps thereof simultaneously in opposite directions to infinitely vary the effective diameters of the belt grooves thereof in opposite directions, respectively, said driving and driven pulleys being mounted with the smaller diameter step of each pulley opposite a larger diameter step of the other pulley to provide belt receiving sets of opposite steps with each set being infinitely adjustable for infinite speed variation over a portion, respectively, of the overall range of speeds at which the driven pulley may be driven from the driving pulley, mechanism for adjusting simultaneously the sets of opposite steps of said driving and driven pulleys equally and in opposite directions, the steps of each of said sets being constructed to provide when in adjusted position at one end of the range of adjustment thereof equal effective diameters of the belt grooves of the steps for belt shifting from one to the other of said sets, and a single endless belt for selective alternate mounting on one or the other of said sets of steps.

9. In an infinitely variable speed drive in combination, a driving pulley and a driven pulley, each of said pulleys including a smaller diameter step and a larger diameter step with each of said steps providing a belt groove therearound, each of said smaller and larger diameter steps of each of said pulleys being constructed and arranged for adjustment simultaneously in opposite directions, respectively, to infinitely vary the effective diameters of the belt grooves thereof in opposite directions, said driving and driven pulleys being mounted with a smaller diameter step of each pulley opposite a larger diameter step of the other pulley to provide sets of opposite steps, a single endless belt for selective alternate mounting on either one or the other of said sets of opposite steps, the opposite steps of one of said sets being constructed to provide relative belt groove diameters for infinite variation thereof when belt connected to drive said driven pulley through a range of lower speeds within the overall range of speeds and the steps of the other set being constructed to provide relative effective belt groove diameters to drive said driven pulley when belt connected through a range of higher speeds within the overall range of speeds of the drive, the opposite steps of each of said sets being also constructed to provide when at the limit of adjustment thereof in one direction equal effective diameters of the belt grooves thereof so as to place said driving and driven pulleys when belt connected to 1:1 driving ratio, and mechanism for infinitely adjusting simultaneously the sets of opposite steps of said pulleys equally and in opposite directions.

10. In an infinitely variable speed drive, in combination, a driving pulley and a driven pulley, each of said pulleys including a smaller diameter step and a larger diameter step with each of said steps providing a belt groove therearound, the smaller and larger diameter steps of each of said pulleys being constructed and arranged for adjustment simultaneously in opposite directions, respectively, to infinitely vary the effective diameters of the belt grooves thereof in opposite directions, said driving and driven pulleys being mounted with a smaller diameter step of each pulley opposite a large diameter step of the other pulley to provide sets of opposite steps, a single endless belt for selective alternate mounting in driving connection on one or the other of said sets and for selective shifting therebetween, the steps of one of said sets of opposite steps being constructed to have relative belt groove diameters to drive said driven pulley through a range of speeds from the minimum low speed of the drive to an intermediate speed within the overall range of speeds, the steps of the other set being constructed to provide relative belt groove diameters to drive said driven pulley through a range of speeds from an intermediate speed to the maximum high speed of the overall range of speeds, the opposite steps of each of said sets being also constructed to provide when at the limit of adjustment thereof in one direction the effective diameters of the belt grooves thereof equal to place said driving and driven pulleys with said single belt on either of said sets in 1:1 driving ratio, and mechanism for infinitely adjusting simultaneously the sets of opposite steps of said pulleys equally and in opposite directions.

11. In an infinitely variable speed drive, in combination, a driving pulley and a driven pulley, each of said pulleys comprising a first pair of discs providing a V-belt receiving groove constituting a smaller diameter step of the pulley, one of said pair of discs being mounted for movement axially of the pulley toward and from the other to increase and decrease the effective diameter of the belt groove, a second pair of discs providing a V-belt receiving groove constituting a larger diameter step of said pulley, the disc of said second pair adjacent the movable disc of said first pair being mounted for movement axially of the pulley toward and from the other disc of said second pair and being connected to the movable disc of said first pair of movements therewith as a unit to simultaneously oppositely vary the effective diameter of the belt grooves of said smaller and larger diameter steps, said driving and driven pulleys being mounted axially relative to each other with the smaller diameter step of one pulley opposite the large diameter step of the other pulley to form sets of opposite steps, a single endless belt for selective alternate mounting in driving connection on one or the other of said sets, and mechanism for adjusting simultaneously the movable disc units of said driving and driven pulleys in opposite directions to infinitely vary the ratio betwen the effective diameters of the belt grooves of the steps of said opposite sets of steps, respectively.

12. In an infinitely variable speed drive, in combination, a driving pulley and a driven pulley, each of said pulleys comprising a first pair of discs providing a V-belt receiving groove constituting a smaller diameter step of the pulley, one of said pair of discs being mounted for movement axially of the pulley toward and from the other to increase and decrease the effective diameter of the belt groove thereof, a second pair of discs providing a V-belt receiving groove constituting a larger diameter step of the pulley, the disc of said second pair adjacent the movable disc of said first pair being mounted for movement axially of the pulley toward and from the other disc of said second pair and being connected to the movable disc of said first pair for movement therewith as a unit in either direction axially of the pulley to simultaneously oppositely vary the effective diameter of the belt grooves of said larger and smaller diameter steps, said driving and driven pulleys being mounted axially relative to each other with the smaller diameter step of one pulley opposite the larger diameter step of the other pulley, a single endless belt for selective alternate mounting in driving connection on one or the other of said sets of opposite steps, and mechanism for adjusting simultaneously the sets of opposite steps of said driving and driven pulleys equally and in opposite directions, said mechanism including an actuating shaft positioned between said pulleys with its axis parallel to the axes of the pulleys, said shaft including opposite hand threaded sections thereon, and actuating arms threadedly receiving the opposite hand threading, respectively, of said shaft and being extended therefrom to and being rotatively coupled with the movable disc units, respectively, of said driving and driven pulleys.

13. In an infinitely variable speed drive, in combination, an adjustable driving pulley and an adjustable driven pulley of the infinitely variable effective belt groove diameter type each including at least one smaller diameter step and one larger diameter step each having a belt groove therearound, said driving pulley and said driven pulley being each constructed for adjustment to vary in opposite directions simultaneously the effective diameters of the belt grooves of the steps thereof, respectively, said driving and driven pulleys being mounted with the smaller step of each pulley opposite the larger step of the other pulley to provide sets of opposite larger and smaller diameter steps, respectively, each smaller step having a maximum effective diameter of the belt groove thereof equal to the minimum effective diameter of the belt groove of each of said larger steps, a single endless belt adapted for selective alternate mounting on and between either of said sets of opposite larger and smaller diameter steps and for shifting from one to the other of said sets, and mechanism for simultaneously adjusting the steps of said driving pulley and the steps of said driven pulley in opposite directions, respectively, for infinite variation of the effective diameters of the belt grooves of said sets of opposite steps, respectively.

14. In an infinitely variable speed drive, in combination, a driving shaft, an adjustable driving pulley of the variable effective belt groove diameter type mounted in driving connection on said driving shaft, an adjustable driven pulley of the variable effective belt groove diameter type mounted on said driven shaft in driving connection therewith, said driving and driven pulleys each including at least one smaller diameter step and one larger diameter step each providing a belt groove therearound, said driving pulley and said driven pulley being each constructed for adjustment to oppositely vary simultaneously in either direction the effective diameters of the belt grooves of each of the steps thereof, respectively, said driving and driven pulleys being mounted with the smaller diameter step of each pulley opposite the larger diameter step of the other pulley to provide sets of opposite smaller and larger diameter steps, each of the smaller diameter steps and each of the larger diameter steps of said driving and driven pulleys, respectively, being constructed to provide the maximum effective diameter of the belt groove of each smaller step equal to the minimum effective diameter of the belt groove of each larger diameter step, a single endless belt for selective alternate mounting in driving connection on one or the other of said sets and for shifting from one set to the other, and mechanism for adjusting simultaneously the steps of said driving pulley and the steps of said driven pulley in opposite directions, respectively.

THEODORE F. ESERKALN.

REFERENCES CITED

The following references are of record in the file of this patent:

UNITED STATES PATENTS

| Number | Name | Date |
| --- | --- | --- |
| 1,993,547 | Heyer | Mar. 5, 1935 |
| 2,175,830 | Davis | Oct. 10, 1939 |
| 2,181,567 | Johnson | Nov. 28, 1939 |
| 2,342,604 | Shaw | Feb. 22, 1944 |

FOREIGN PATENTS

| Number | Country | Date |
| --- | --- | --- |
| 696,031 | Germany | Sept. 9, 1940 |